(12) United States Patent
Sugiura et al.

(10) Patent No.: US 8,090,948 B2
(45) Date of Patent: Jan. 3, 2012

(54) IMAGE FORMATION SYSTEM HAVING AUTHENTICATION FUNCTION (75) Inventors: Hiroshi Sugiura, Hoi-gun (JP); Atsushi Tomita, Toyohashi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1503 days.

(21) Appl. No.: 11/019,030

(22) Filed: Dec. 22, 2004

(65) Prior Publication Data
US 2006/0107039 A1    May 18, 2006

(30) Foreign Application Priority Data

Nov. 18, 2004   (JP) ................. 2004-334851

(51) Int. Cl.
*H04L 9/32*     (2006.01)
(52) U.S. Cl. ........................ 713/175; 713/170
(58) Field of Classification Search .............. 713/182, 713/156, 168, 170, 172, 173, 175, 185; 358/1.15, 358/1.13, 405, 305; 709/225, 229; 380/55; 726/9, 10, 3, 5, 7, 8, 19, 20, 26–30
See application file for complete search history.

(56) References Cited

U.S. PATENT DOCUMENTS

| | | | |
|---|---|---|---|
| 6,360,254 B1* | 3/2002 | Linden et al. | 709/219 |
| 6,385,728 B1* | 5/2002 | DeBry | 726/9 |
| 7,011,462 B2 | 3/2006 | Hanaoka | |
| 7,443,527 B1* | 10/2008 | Shigeeda | 358/1.15 |
| 2002/0184444 A1* | 12/2002 | Shandony | 711/118 |
| 2003/0018900 A1* | 1/2003 | Endoh | 713/182 |
| 2004/0070782 A1* | 4/2004 | Mihira | 358/1.14 |
| 2004/0187036 A1* | 9/2004 | Nakamura | 713/202 |
| 2005/0066163 A1* | 3/2005 | Ikenoya | 713/156 |
| 2005/0073709 A1 | 4/2005 | Kujirai et al. | |

FOREIGN PATENT DOCUMENTS

| | | |
|---|---|---|
| JP | 2001117737 | 4/2001 |
| JP | 2001-312377 | 11/2001 |
| JP | 2002169673 | 6/2002 |
| JP | 2003-233725 | 8/2003 |
| JP | 2003-271356 | 9/2003 |
| JP | 2003264551 | 9/2003 |
| JP | 2003288323 | 10/2003 |
| JP | 2003-348281 | 12/2003 |

* cited by examiner

*Primary Examiner* — Nirav B. Patel
(74) *Attorney, Agent, or Firm* — Buchanan Ingersoll & Rooney PC (57) ABSTRACT

Image data is transmitted from a client PC to an image formation apparatus. Upon printing, an external server conducts an authentication process. A certificate indicating that the user has been authenticated is held, with its validity period provided in the image formation apparatus. Within the validity period, the time-consuming authentication process with respect to the external server is skipped. This can reduce the burden of authentication while ensuring security, so that high productivity is guaranteed.

10 Claims, 12 Drawing Sheets

| CERTIFICATE MANAGEMENT TABLE | | | | |
|---|---|---|---|---|
| USER NAME | PASSWORD | CERTIFICATE ID | REGISTRATION TIME | VALIDITY PERIOD |
| sato | 12qwaszx | mfp1_1112 | 0403031330 | 3 |
| suzuki | 34erdfcv | mfp1_1113 | 0403031331 | 2 |

IMAGE FORMATION SYSTEM HAVING AUTHENTICATION FUNCTION

This application is based on Japanese Patent Application No. 2004-334851 filed with the Japan Patent Office on Nov. 18, 2004, the entire content of which is hereby incorporated by reference.

BACKGROUND OF THE INVENTION

1. Field of the Invention

The present invention relates to image formation systems and apparatuses, and particularly to an image formation system and apparatus having an authentication function.

2. Description of the Related Art

There is known a technique where multi function peripherals (MFP) as a type of an image formation apparatus and personal computers (PC) are connected to a network, and data is sent from a PC to an MFP to make it carry out printing.

In recent years, user authentication has been required when using an MFP, from the standpoint of security. Normally, when copying jobs are to be performed at the MFP, once the user authentication is conducted, a plurality of copying jobs are permitted until the authenticated state is cancelled.

Japanese Laid-Open Patent Publication No. 2001-117737 discloses a technique where, upon printing of data from a PC at a printer, an external server is inquired whether the user is one permitted to execute printing, and if so, a ticket is transmitted from the external server to the printer, where the printing is carried out.

Japanese Laid-Open Patent Publication No. 2002-169673 discloses a management system that authenticates and permits installation of a printer driver for only the authenticated user.

Japanese Laid-Open Patent Publication No. 2003-288323 discloses a system having a plurality of devices, wherein while an operation of a first device by a user is permitted by authentication, if an authentication request is received from the same user at a second device, the use is prohibited or limited to some extent.

Japanese Laid-Open Patent Publication No. 2003-264551 discloses a technique where a mail address of a portable terminal is registered in advance at a server, and when the portable terminal accesses the server, the server transmits a URL with a key to the portable terminal by mail. The portable terminal having received the mail accesses the URL with the key received. The server determines whether a period of time from the time when the URL with the key was transmitted to the portable terminal and the time when the portable terminal accessed the URL with the key is within a prescribed period of time, and based on the result, permits/prohibits the access to the URL.

In the case where data is sent out of a PC to be printed by an external device, authentication is required for each job. When this authentication process is performed at an external server, it may take some time due to the communication time dependent on the network environment, or due to localization of the processing load to the external server. For example, in the case where printing is to be conducted from a PC, if an authentication request is sent to an external server, one authentication may take several minutes in the worst case, considerably degrading the productivity.

Further, when the technique to conduct the authentication only at the time of installation of a printer driver is employed, security is poor with a shared PC. Even in the case of a personal PC, there will arise a security problem when an unauthorized person uses it.

SUMMARY OF THE INVENTION

The present invention has been made to solve the above-described problems, and an object of the present invention is to provide an image formation system and apparatus that can ensure security while reducing the burden of authentication.

To solve the above-described problems, according to an aspect of the present invention, an image formation system includes a terminal device, an image formation apparatus and a server device. The terminal device includes an inputting portion inputting user identification information, and a sender sending a print job including the user identification information to the image formation apparatus. The image formation apparatus includes a receiver receiving the print job including the user identification information, a requester requesting authentication of the server device as to whether the user identification information is one from a user permitted to use the image formation apparatus, an image forming portion, in receipt of a certificate issued by the server device indicating that the user is permitted to use the image formation apparatus, forming an image based on the print job, a holder holding the certificate during a validity period of the certificate, and a simplified authentication portion determining whether the user identification information received is one from the user for whom the certificate is held by the holder. The image forming portion performs an image formation process when the simplified authentication portion determines that the certificate exists, without requesting of the authentication by the requester. The server device includes an authentication portion performing authentication as to whether the user is one permitted to use the image formation apparatus based on the user identification information for which the authentication was requested by the requester, and an issuer issuing the certificate indicating that the user is permitted to use the image formation apparatus by the authentication portion and sending the certificate to the image formation apparatus.

According to another aspect of the present invention, an image formation apparatus includes a receiver receiving a print job including user identification information, a requester requesting authentication of an external authentication device as to whether the user identification information is one from a user permitted to use the image formation apparatus, an image forming portion, in receipt of a certificate issued by the external authentication device indicating that the user is permitted to use the image formation apparatus, forming an image based on the print job, a holder holding the certificate during a validity period of the certificate, and a simplified authentication portion determining whether the user identification information received is from the user for whom the certificate is held by the holder. The image forming portion performs an image formation process when the simplified authentication portion determines that the certificate exists, without requesting of the authentication by the requester.

According to a further aspect of the present invention, an image formation system includes a terminal device, an image formation apparatus and a server device. The terminal device includes an inputting portion inputting user identification information, a requester requesting authentication of the server device as to whether the user identification information is one for a user permitted to use the image formation apparatus, a sender sending a certificate issued by the server device indicating that the user is the one permitted to use the image formation apparatus together with a print job to the image formation apparatus, a holder holding the certificate during a validity period of the certificate, and a simplified authentication portion determining whether the user identification information received is one from the user for whom the certificate is held by the holder. When the simplified authentication portion determines that the certificate exists, the sender sends the print job to the image formation apparatus, with the authentication request by the requester being skipped. The server device includes an authentication portion performing authentication as to whether the user is one permitted to use the image formation apparatus based on the user identification information for which the authentication was requested by the requester, and an issuer issuing the certificate indicating that the user is permitted to use the image formation apparatus by the authentication portion and sending the certificate to the terminal device. The image formation apparatus includes a receiver receiving the print job including the certificate, and an image forming portion forming an image based on the print job. The image forming portion performs an image formation process when receiving the certificate from the terminal device.

According to yet another aspect of the present invention, an image formation system includes a terminal device, an image formation apparatus and a server device. The terminal device includes an inputting portion inputting user identification information, and a sender sending a print job including the user identification information to the image formation apparatus. The image formation apparatus includes a receiver receiving the print job including the user identification information, a requester requesting authentication of the server device as to whether the user identification information is one from a user permitted to use the image formation apparatus, and an image forming portion, in receipt of a certificate issued by the server device indicating that the user is permitted to use the image formation apparatus, forming an image based on the print job. The requester requests the authentication collectively for a plurality of print jobs. The server device includes an authentication portion performing authentication as to whether the user is one permitted to use the image formation apparatus based on the user identification information for which the authentication was requested by the requester, and an issuer issuing the certificate indicating that the user is permitted to use the image formation apparatus by the authentication portion and sending the certificate to the image formation apparatus.

According to still another aspect of the present invention, an image formation apparatus includes a receiver receiving a print job including user identification information, a requester requesting authentication of an external authentication device as to whether the user identification information is one from a user permitted to use the image formation apparatus, and an image forming portion, in receipt of a certificate issued by the external authentication device indicating that the user is permitted to use the image formation apparatus, forming an image based on the print job. The requester requests the authentication collectively for a plurality of print jobs.

In accordance with the present invention, the use of the certificate makes it possible to provide an image formation system and apparatus that can reduce the burden of authentication and at the same time ensure security.

Further, by performing the authentication process collectively for a plurality of jobs, it is possible to provide an image formation system and apparatus where the burden of authentication is reduced and security is guaranteed as well.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention will be described.

In the present embodiments, an image formation system is basically comprised of a PC, an image formation apparatus, and an authentication server. Data is transmitted from the PC to the image formation apparatus, and upon printing, the external authentication server performs an authentication process. A resultant authentication has a validity period, within which the image formation apparatus permits to skip the authentication process with respect to the external server.

With this configuration, when the same user transmits job data from a PC for continuous printing jobs, the result of the authentication process for the first job can be used for the subsequent jobs as well, eliminating the need to repeat the authentication process a plurality of times.

As such, it is possible to provide an image formation system that can ensure security without degrading productivity.

First Embodiment

Figure 1:
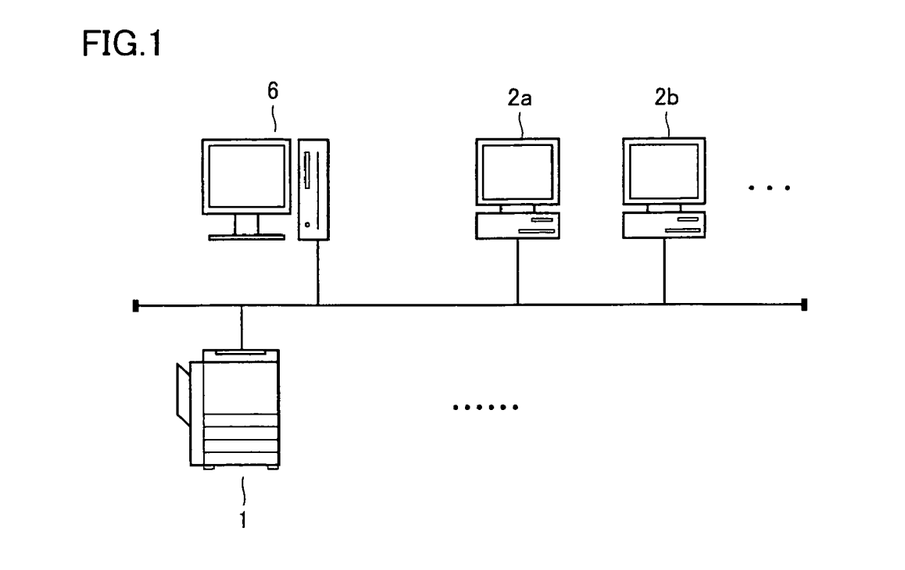
FIG. 1 shows a configuration of an image formation system according to a first embodiment of the present invention.

Referring to FIG. 1, an image formation system is comprised of an image formation apparatus 1 being an MFP or the like, client PC 2a, 2b, . . . being terminal devices, and an authentication server 6. Image formation apparatus 1, client PC 2a, 2b, . . . and authentication server 6 are connected over a network.

Image formation apparatus 1 is for forming copies of a scanned original image and images generated from print data received from client PC 2a, 2b, . . . on sheets of paper.

Figure 2:
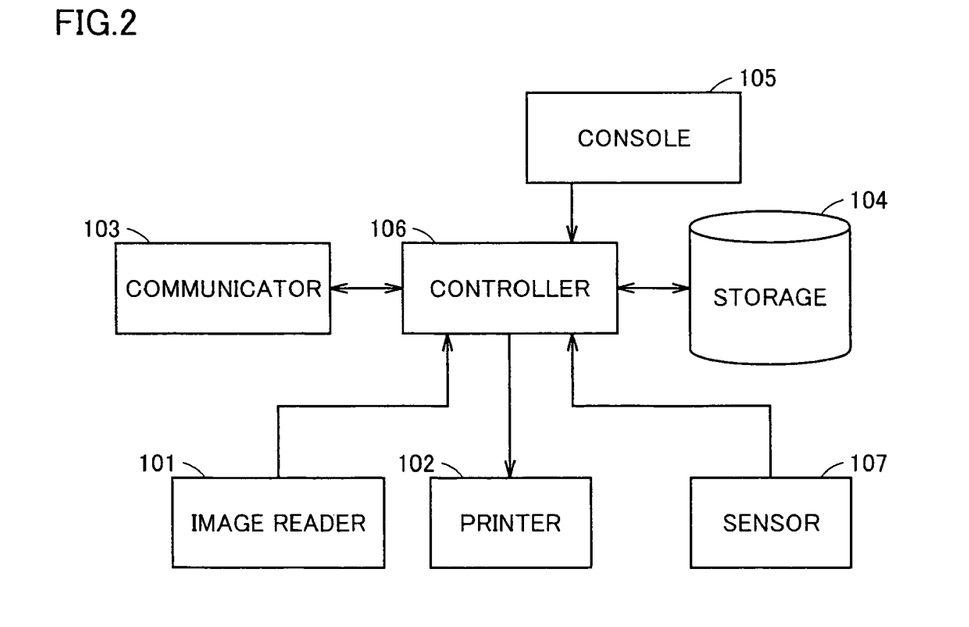
FIG. 2 is a block diagram showing a hardware configuration of the image formation apparatus 1 in FIG. 1.

FIG. 2 is a block diagram showing a hardware configuration of image formation apparatus 1 of FIG. 1.

Referring to FIG. 2, image formation apparatus 1 includes a controller 106 that controls the entire apparatus, an image reader 101 that reads image data from an original, a printer 102 that prints an image on a sheet of paper, a communicator 103 that performs short-distance radio communications and connects a printing device to a network or a telephone line, a storage 104 that stores job data and others, a console 105 that serves as an interface with a user, and a sensor 107 that detects, for example, an amount of a consumable available.

Figure 3:
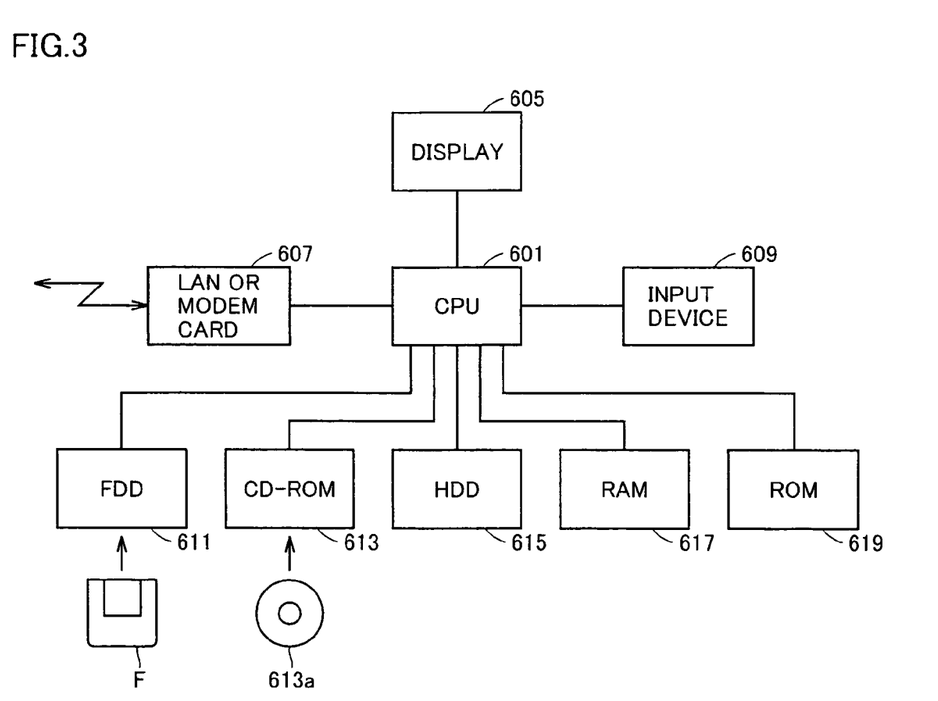
FIG. 3 is a block diagram showing a hardware configuration of a client PC in FIG. 1.

FIG. 3 is a block diagram showing a hardware configuration of a client PC shown in FIG. 1.

Referring to FIG. 3, the client PC includes a CPU 601 that generally controls the device, a display 605, a local area network (LAN) card 607 (or a modem card) for connection to a network or for communications with the outside, an input device 609 formed of keyboard, mouse and the like, a flexible disk drive 611, a CD-ROM drive 613, a hard disk drive 615, a RAM 617, and a ROM 619.

Flexible disk drive 611 allows reading data such as a program recorded on a flexible disk F, and CD-ROM drive 613 allows reading data such as a program recorded on a CD-ROM 613a.

Figure 4:
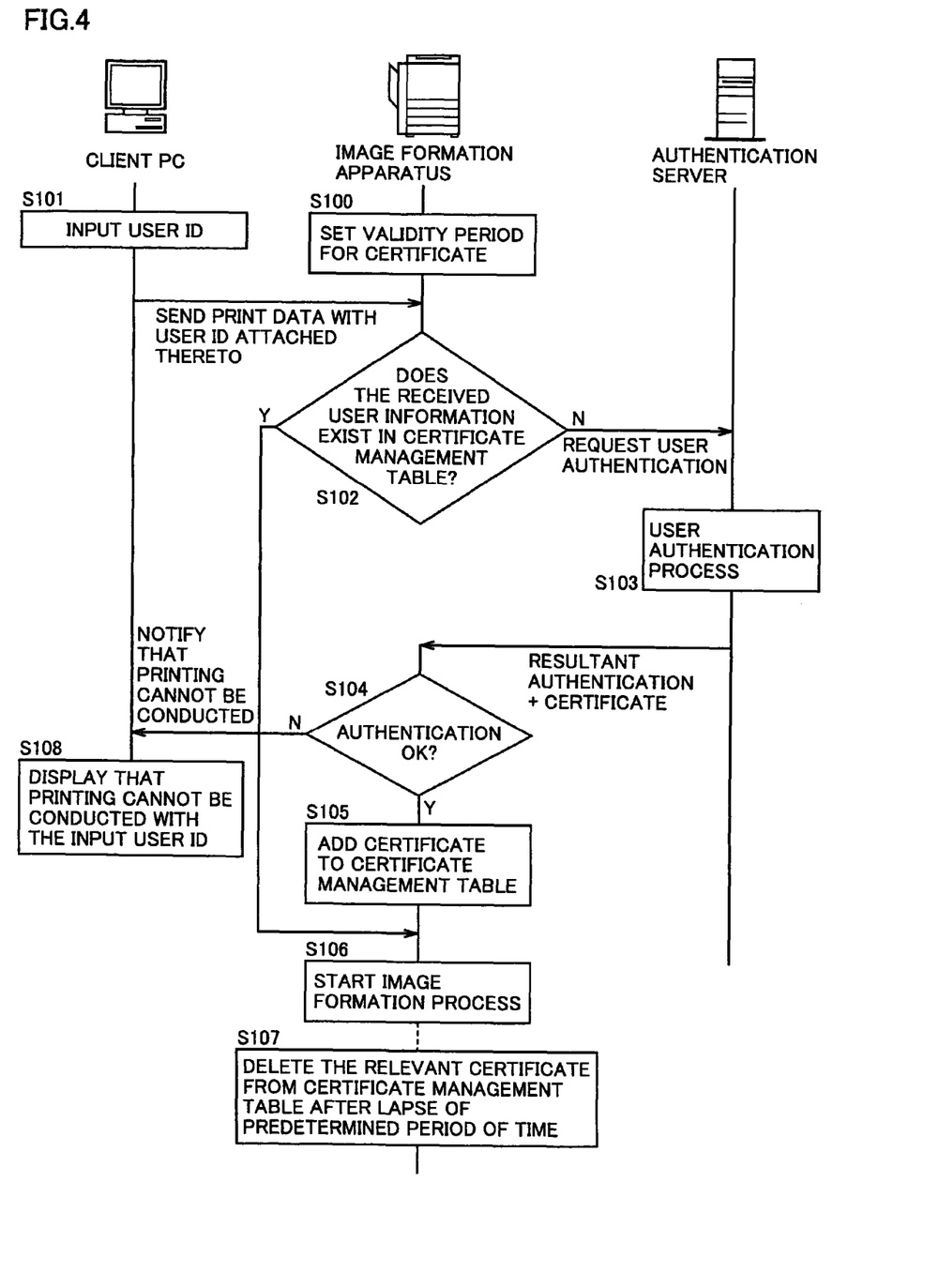
FIG. 4 is a flowchart illustrating a process carried out in the image formation system according to the first embodiment.

FIG. 4 is a flowchart illustrating a process carried out in the image formation system according to the first embodiment of the present invention.

In step S100, a user sets in the image formation apparatus a validity period of a certificate to be acquired by a user authentication process. The validity period may be set based on an input from console 105 on the image formation apparatus, or may be set remotely from an external PC or the like.

Alternatively, a fixed value may be preset as the validity period in a ROM within the image formation apparatus. The validity period may correspond to a period of time required to finish an image formation process at the image formation apparatus.

In step S101, the user inputs, on a client PC, a user name and an ID or password (user information) for identification of the user. When the user makes a print request, print data is transmitted to the image formation apparatus, with the user information attached thereto.

In step S102, the user information received from the client PC is compared with user information of a certificate within a certificate management table that is held in the image formation apparatus. The user information in the certificate management table is subject to management during the validity period having been set in the image formation apparatus in step S100.

If there is no certificate containing the matching user information (NO in S102), the image formation apparatus requests user authentication of the authentication server. If there is a certificate with the matching user information (YES in S102), it starts the image formation process in step S106, without requesting the user authentication process.

In step S103, the authentication server conducts the user authentication process with the user information received from the image formation apparatus. A resultant authentication OK/NG is transmitted to the image formation apparatus.

In the case of the authentication OK, a certificate is sent to the image formation apparatus having made the request.

In the case of the authentication OK as a result of the user authentication process (YES in S104), the image formation apparatus adds the certificate to the certificate management table and starts management (S105). In the case of the authentication NG (NO in S104), the image formation apparatus notifies the client PC that the user information is wrong. In response, in step S108, the client PC provides a display indicating that printing cannot be conducted with the input user ID.

In step S106, the image formation apparatus starts the image formation process, wherein the print data is converted to image data, and an image is generated based on the image data and copied on a recording sheet.

As to the certificate having been put under the management in the certificate management table in step S105, when its validity period set in step S100 has expired, the image formation apparatus deletes it from the management table in step S107.

Figure 5:
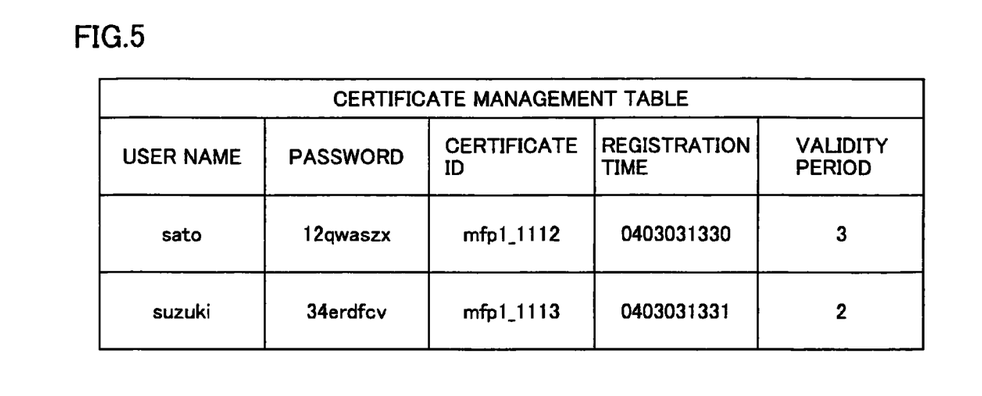
FIG. 5 shows a configuration of a certificate management table held in an image formation apparatus.

FIG. 5 shows a configuration of a certificate management table held in the image formation apparatus.

Referring to FIG. 5, the certificate management table includes, as a certificate, a user name, a password (ID), a certificate ID, and a registration time and a validity period of the certificate.

Once a certificate is issued, the user is permitted to use the image formation apparatus during the predetermined validity period. This means that the user can use the image formation apparatus any time within the relevant period of time without the need to make an authentication request to the authentication server, which improves the usability of the apparatus.

Figure 6:
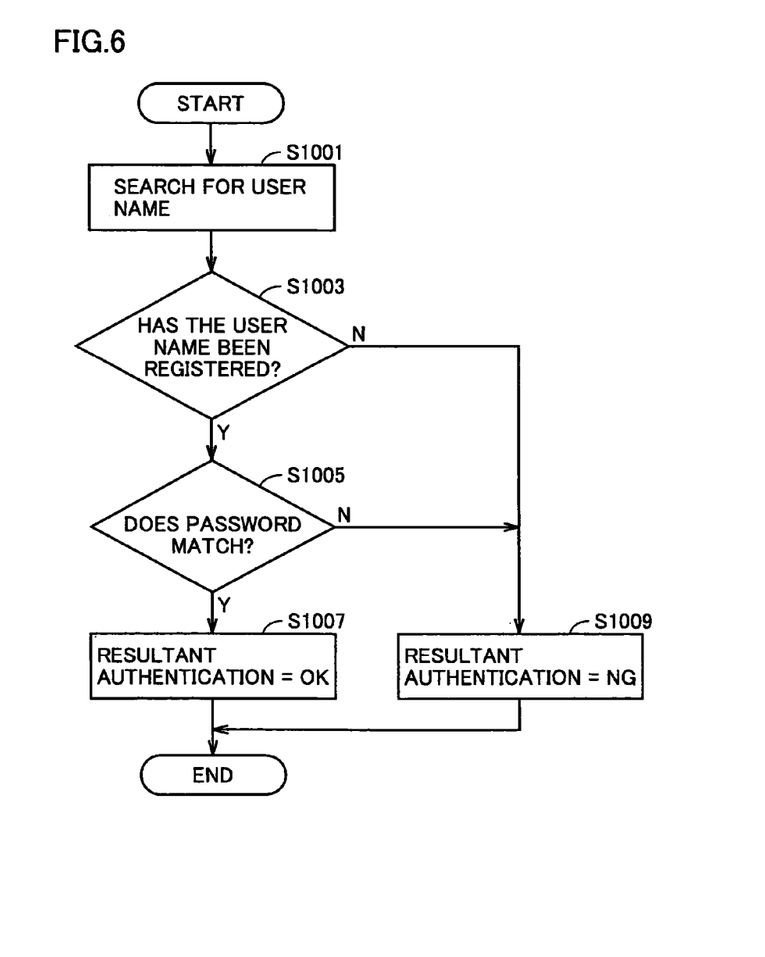
FIG. 6 is a flowchart illustrating an authentication process carried out in step S103 of FIG. 4.

FIG. 6 is a flowchart illustrating the authentication process carried out in step S103 of FIG. 4.

Referring to FIG. 6, in step S1001, a search is conducted for a user name of the user as a subject of authentication. In step S1003, it is determined whether the user name has been registered. If YES, it is further determined in step S1005 whether an input password matches the one corresponding to the relevant user name.

If YES in step S1005, it is determined that a resultant authentication is OK in step S1007. If it is determined NO in step S1003 or S1005, then it is determined that a resultant authentication is NG in step S1009.

A process identical to that indicated in FIG. 6 is conducted in the process of comparing the user information with the data within the certificate management table.

It is noted that the validity period of the certificate obtained by the user authentication process may be set on a client PC. At this time, the validity period may be set for each job, or it may be configured such that a content once set is reflected to all the jobs. Further, a fixed value may be set at the time of installation of a printer driver, not permitting the setting by the user.

The validity period of the certificate having been set on the client PC can be attached to the print data, together with the user information, to be notified to the image formation apparatus, although the timing of notification of the validity period set is not restricted specifically. The same applies to the succeeding embodiments.

Alternatively, the validity period of the certificate obtained by the user authentication process may be set on the authentication server. At this time, the validity period may be set for each user, or may be set for each image formation apparatus.

The validity period of the certificate having been set on the authentication server can be notified to the image formation apparatus together with a result of the user authentication process, although the reporting timing of the set validity period is not restricted specifically. The same applies to the succeeding embodiments.

Second Embodiment

An image formation system according to the second embodiment of the present invention has a hardware configuration identical to that shown in FIGS. 1-3, -and thus, description thereof is not repeated here.

The second embodiment is characterized in that the certificate management table is held in the client PC, and the certificates are subject to management in the client PC.

Figure 7:
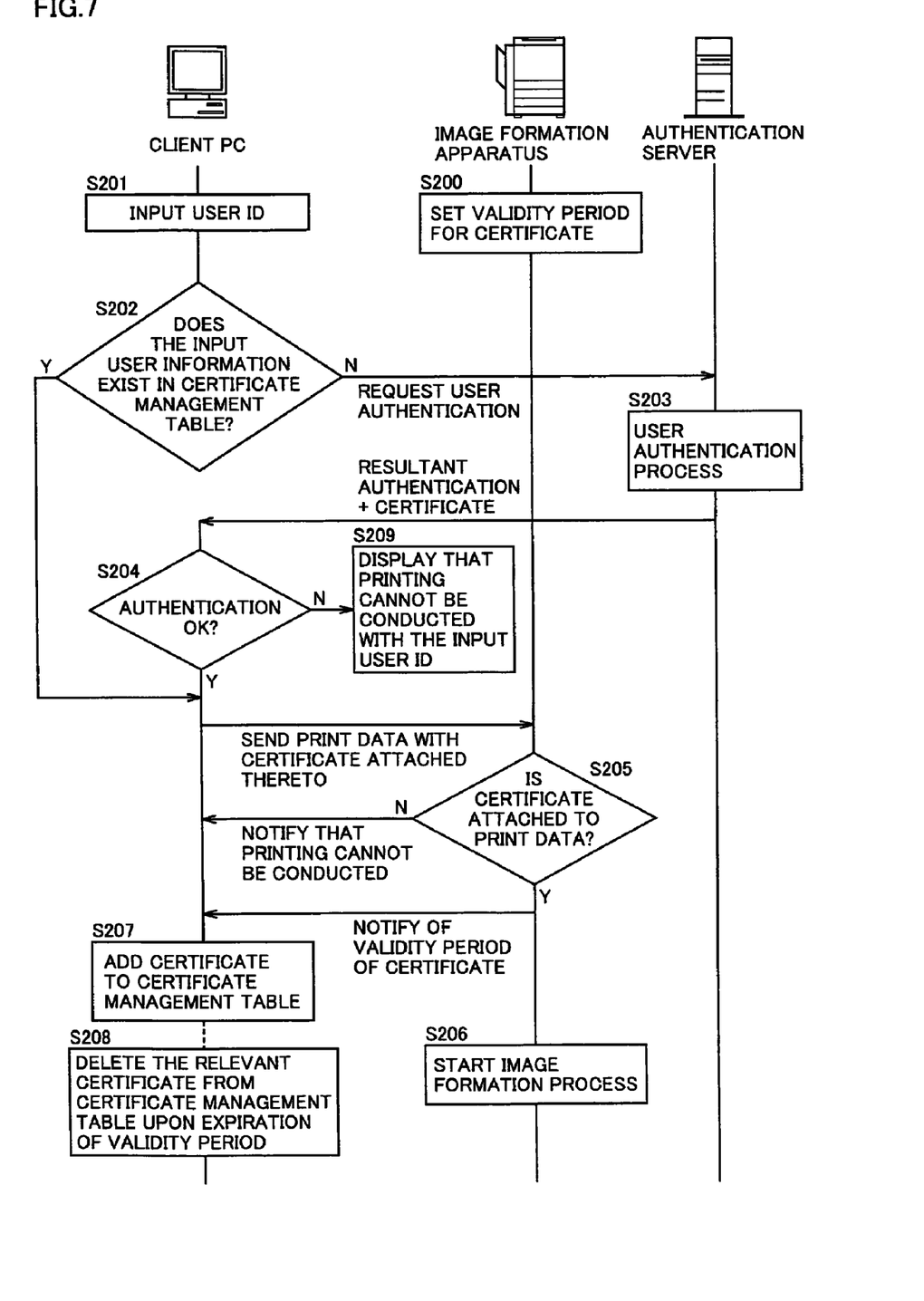
FIG. 7 is a flowchart illustrating a process carried out in an image formation system according to a second embodiment of the present invention.

FIG. 7 is a flowchart illustrating a process carried out in an image formation system according to the second embodiment.

Referring to FIG. 7, the processes in steps S200 and S201 are identical to those in steps S100 and S101 in FIG. 4, and therefore, description thereof is not repeated here.

In step S202, upon a print request from a user, it is determined whether there is any certificate in the certificate management table held in the client PC. If there exist(s) certificate (s) under the management, it is determined whether there exists a certificate containing user information that matches the user information input in step S201 (S202). If there is no certificate containing the user information matching that input in step S201 (NO in S202), a user authentication request is made to the authentication server. If there is such a certificate (YES in S202), print data having the certificate attached thereto is sent to the image formation apparatus, with the user authentication process skipped.

In step S203, the authentication server performs the user authentication process based on the user information received from the client PC. A resultant authentication OK/NG is sent to the client PC. In the case of the authentication OK, a certificate is sent to the client PC having made the request.

If it is the authentication OK as a result of the user authentication process (YES in S204), the client PC sends print data with the certificate attached thereto, to the image formation apparatus. In the case of the authentication NG (NO in S204), it notifies the user that the user information input is wrong (S209).

In step S205, the image formation apparatus having received the print data determines whether a certificate is attached to the print data. If it is confirmed that the certificate is attached thereto (YES in S205), the image formation apparatus starts the image formation process in step S206. It also notifies the client PC of the validity period of the certificate. If the certificate is not attached (NO in S205), it notifies the client PC that printing cannot be conducted.

In step S207, the client PC starts management of the relevant certificate in the certificate management table, based on its validity period received from the image formation apparatus.

Upon expiration of the validity period set in step S200 for the certificate having been put under the management in the certificate management table in step S207, the client PC deletes the relevant certificate from the management table in step S208.

Third Embodiment

An image formation system according to the third embodiment of the present invention has a hardware configuration identical to that shown in FIGS. 1-3, and thus, description thereof is not repeated here.

The third embodiment is characterized in that, when there is no user registration in the certificate management table, the client PC obtains a certificate through authentication by the authentication server, and resends the print data with the certificate attached thereto.

Figure 8:
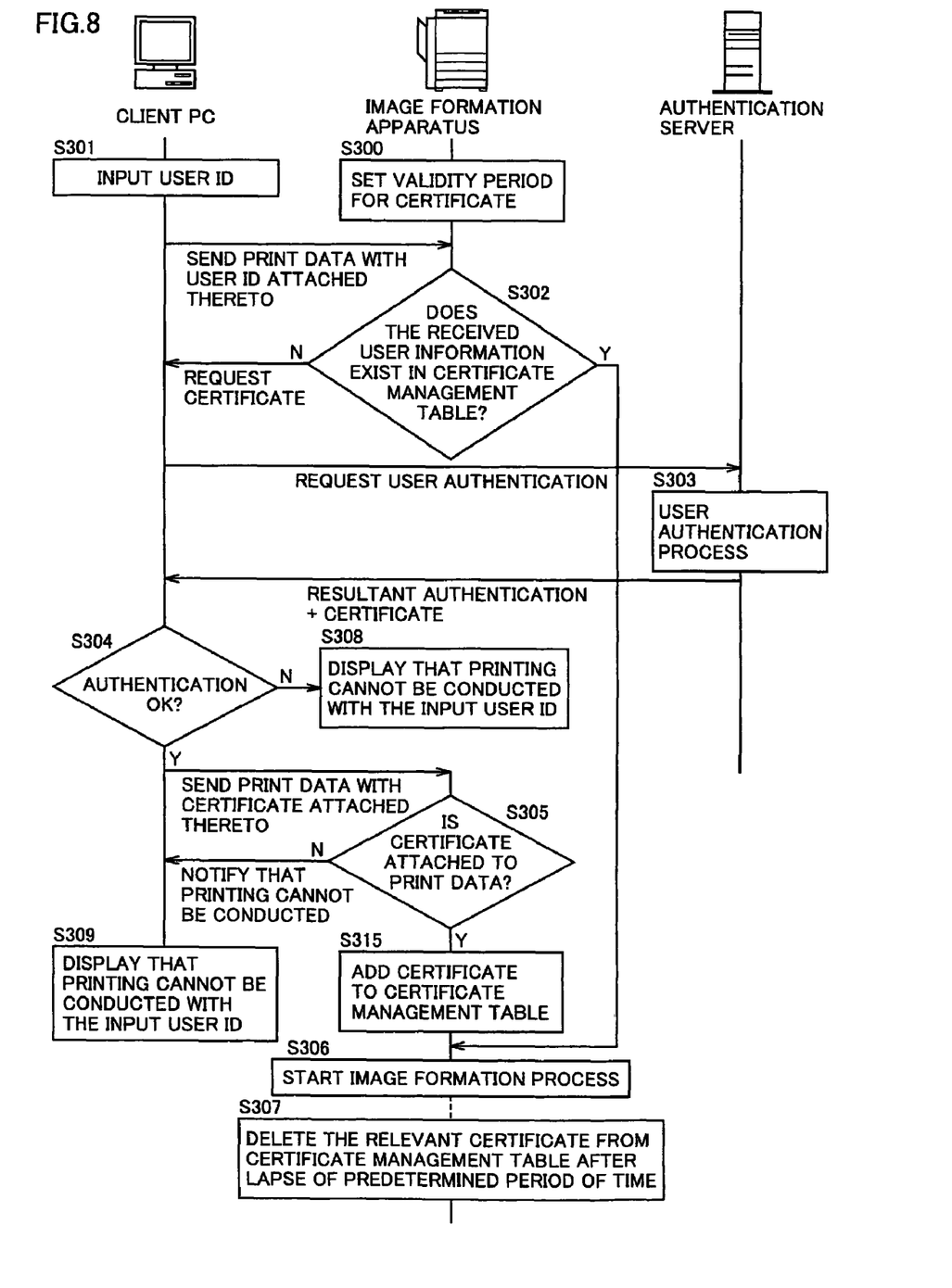
FIG. 8 is a flowchart illustrating a process carried out in an image formation system according to a third embodiment of the present invention.

FIG. 8 is a flowchart illustrating a process carried out in an image formation system according to the third embodiment.

Referring to FIG. 8, the processes in steps S300 and S301 are identical to those in steps S100 and S101 in FIG. 4, and thus, description thereof is not repeated here.

In step S302, the user information received form the client PC is compared with the user information of a certificate within the certificate management table held in the image formation apparatus. If there is no certificate containing the matching user information and under the management during the validity period having been set (NO in S302), the image formation apparatus requests a certificate from the client PC. If there is a certificate containing the matching user information (YES in S302), the image formation apparatus starts an image formation process in step S306. If there is a request for the certificate from the image formation apparatus to the client PC, the client PC makes a user authentication request to the authentication server.

The processes in steps S304-S305 and S308 are identical to those in steps S203-S205 and S209 in FIG. 7, and therefore, description thereof is not repeated here.

Further, the processes in steps S309, S315, S306 and S307 are identical to those in steps S108, S105, S106 and S107 in FIG. 4, and therefore, description thereof is not repeated here.

Fourth Embodiment

An image formation system according to the fourth embodiment of the present invention has a hardware configuration identical to that shown in FIGS. 1-3, and thus, description thereof is not repeated here.

The fourth embodiment is characterized in that the certificate management table is held in the client PC, and the image formation apparatus obtains a certificate from the authentication server and sends it to the client PC.

Figure 9:
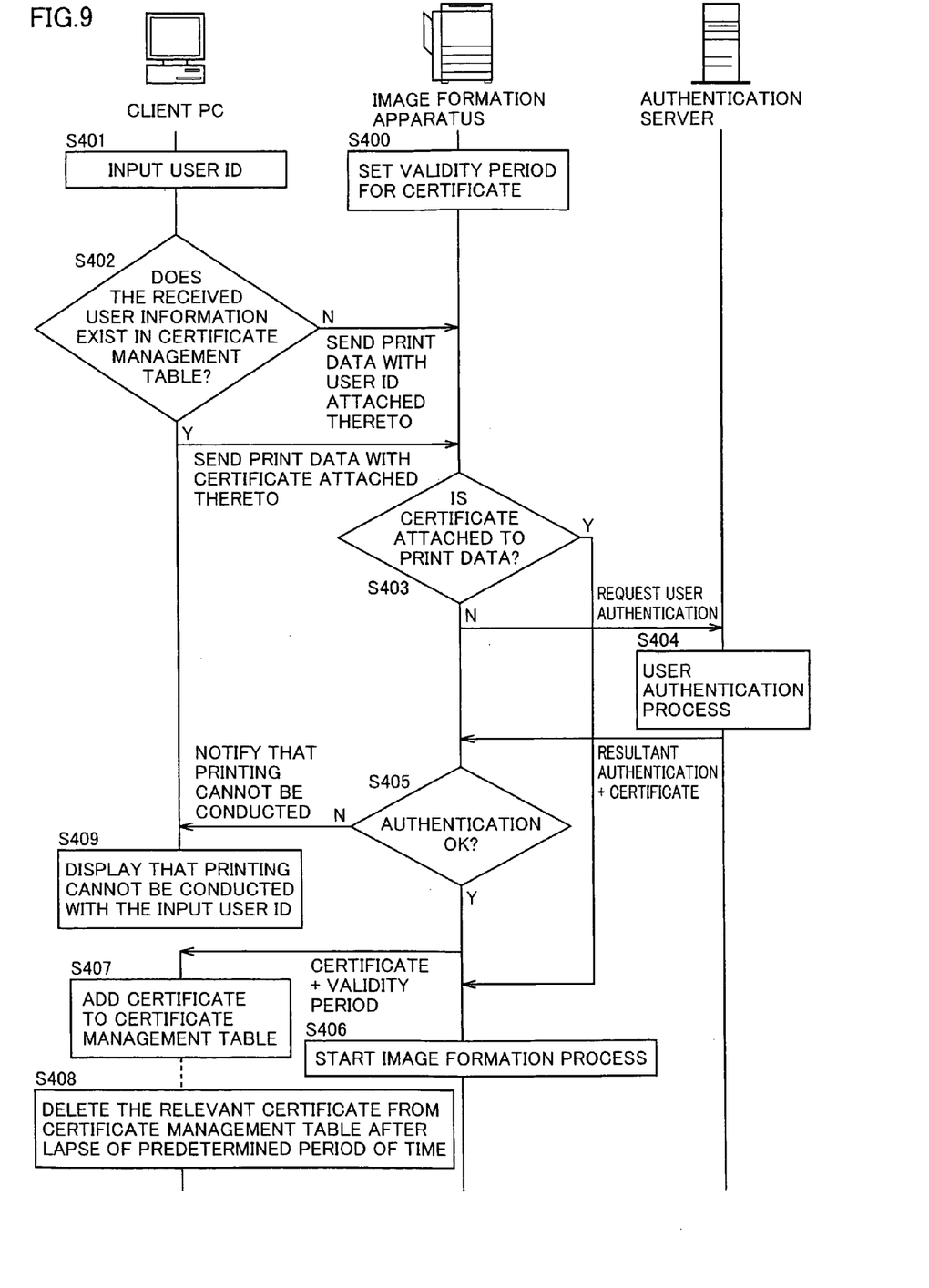
FIG. 9 is a flowchart illustrating a process carried out in an image formation system according to a fourth embodiment of the present invention.

FIG. 9 is a flowchart illustrating a process carried out in an image formation system according to the fourth embodiment.

Referring to FIG. 9, the processes in steps S400 and S401 are identical to those in steps S100 and S101 in FIG. 4, and thus, description thereof is not repeated here.

In step S402, when there is a print request from a user, it is determined whether there is any certificate in the certificate management table held in the client PC. If there exist(s) certificate(s) subject to management, it is determined whether there is a certificate having user information that matches the user information input in step S401. As a result, if there is no certificate containing the user information matching the user information input in step S401 (NO in S402), the client PC sends print data along with the user information to the image formation apparatus. If there is such a certificate (YES in S402), it sends the print data with the certificate attached thereto, to the image formation apparatus.

In step S403, the image formation apparatus determines whether the print data received from the client PC has a certificate attached thereto. If the certificate is attached (YES in S403), the image formation apparatus starts an image formation process in step S406. If there is no certificate attached (NO in S403), the image formation apparatus requests user authentication of the authentication server for the user information attached to the print data. In response, the authentication server performs the authentication process (S404).

In the case of the authentication OK as a result of the user authentication process (YES in S405), the image formation apparatus notifies the client PC of the certificate and its validity period. In the case of the authentication NG (NO in S405), it notifies the client PC that the input user information is wrong. In response, the client PC provides a display indicating that printing cannot be conducted (S409).

The processes in steps S406-S408 are identical to those in steps S206-S208 in FIG. 7, and therefore, description thereof is not repeated here.

Operation 1 of Image Formation Apparatus

Figure 10:
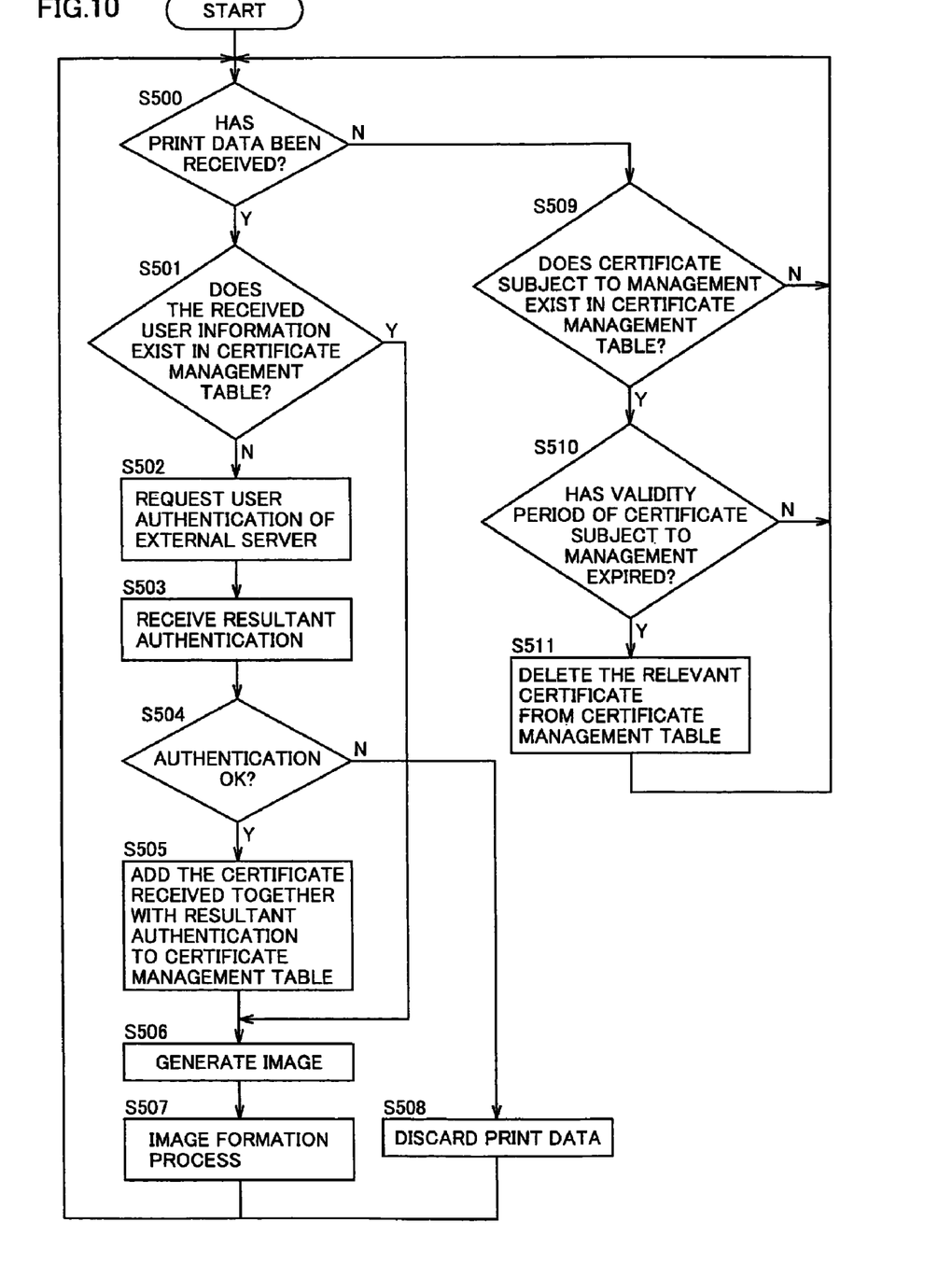
FIG. 10 is a flowchart illustrating an operation of an image formation apparatus that is adopted into the image formation system according to the first embodiment.

FIG. 10 is a flowchart illustrating an operation of an image formation apparatus that is adopted into the image formation system according to the first embodiment of the present invention.

Referring to FIG. 10, in step S500, the image formation apparatus determines whether print data has been received. If YES, it determines in step S501 whether the user information received together with the print data exists in the certificate management table. If YES, it generates an image based on the print data in step S506, and performs the image formation process in step S507.

If NO in step S501, the image formation apparatus requests authentication of the external server in step S502, and receives its result in step S503. If authentication is successful (authentication OK) (YES in S504), the image formation apparatus adds the certificate received together with the resultant authentication to the certificate management table in step S505, and then performs the processes in and after step S506.

If NO in step S504, it discards the print data in step S508.

If NO in step S500, the image formation apparatus determines whether there is a certificate in the certificate management table in step S509. If YES, it determines whether the validity period of the certificate under the management has expired or not in step S510. If YES, it deletes the relevant certificate from the certificate management table in step S511.

Operation 2 of Image Formation Apparatus

Figure 11:
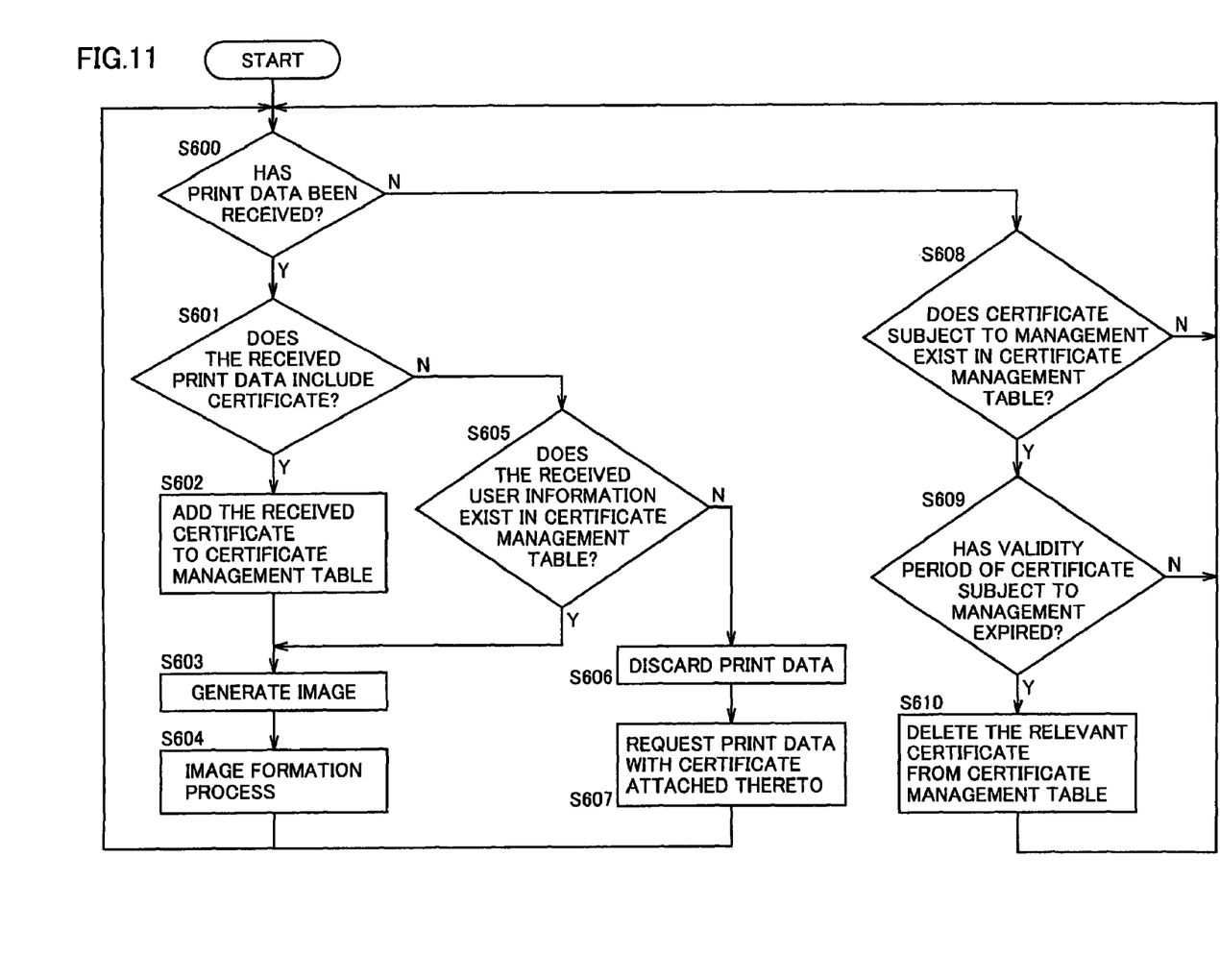
FIG. 11 is a flowchart illustrating an operation of an image formation apparatus that is adopted into the image formation system according to the third embodiment.

FIG. 11 is a flowchart illustrating an operation of an image formation apparatus that is adopted into the image formation system according to the third embodiment of the present invention.

Referring to FIG. 11, in step S600, the image formation apparatus determines whether print data has been received. If YES, it determines whether the received print data includes a certificate in step S601.

If YES in step S601, the image formation apparatus adds the received certificate to the certificate management table in step S602. Thereafter, it generates an image based on the print data in step S603, and performs the image formation process in step S604.

If NO in step S601, the image formation apparatus determines in step S605 whether the received user information exists in the certificate management table. If YES, it proceeds to step S603. If NO, it discards the print data in step S606, and requests print data with a certificate attached thereto in step S607.

If NO in step S600, the image formation apparatus determines whether there is a certificate in the certificate management table in step S608. If YES, it determines whether the validity period of the certificate under the management has expired or not in step S609. If YES, it deletes the relevant certificate from the certificate management table in step S610.

Fifth Embodiment

An image formation system according to the fifth embodiment of the present invention has a hardware configuration identical to that shown in FIGS. 1-3, and thus, description thereof is not repeated here.

In the present embodiment, the image formation apparatus makes an authentication request collectively for the print data having been received while an image formation process is being performed for another job.

Figure 12:
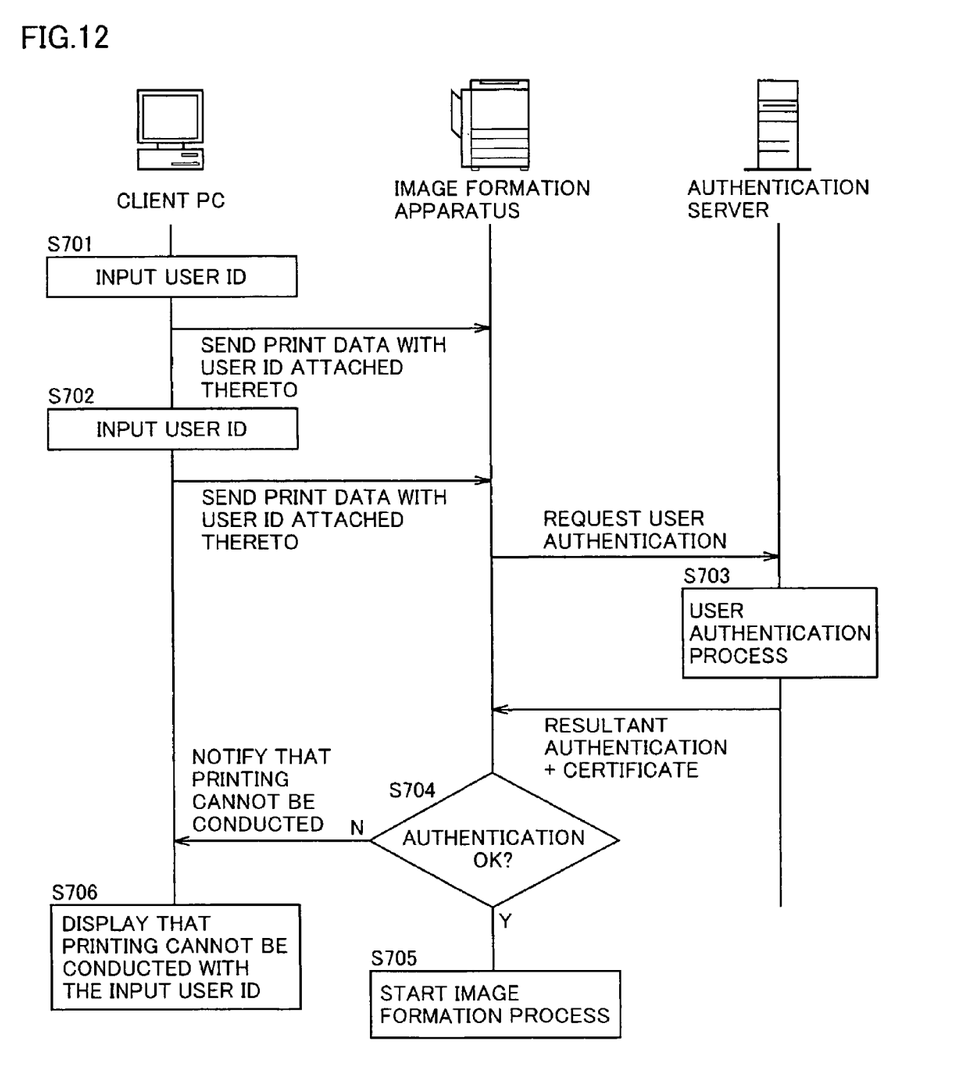
FIG. 12 is a flowchart illustrating a process carried out in an image formation system according to a fifth embodiment of the present invention.

FIG. 12 is a flowchart illustrating a process carried out in an image formation system according to the fifth embodiment.

In step S701, a user inputs a user name and an ID or password (user information) for identification of the user on the client PC. When the user makes a print request, print data for one job, with the user information attached thereto, is transmitted to the image formation apparatus. In step S702, similarly, print data for one job is transmitted.

The image formation apparatus requests user authentication of the authentication server collectively for the print data of the plurality of jobs received. In step S703, the authentication server performs the user authentication process.

A resultant authentication OK/NG is transmitted to the image formation apparatus. In the case of the authentication OK, a certificate is sent to the image formation apparatus having made the request.

In the case of the authentication OK as a result of the user authentication process (YES in S704), the image formation apparatus starts the image formation process in step S705, wherein the print data is converted to image data, and an image is generated based on the image data and copied onto a recording sheet.

In the case of the authentication NG (NO in S704), the image formation apparatus notifies the client PC that the user information is wrong. In response, in step S706, the client PC provides a display indicating that printing cannot be conducted with the input user ID.

Sixth Embodiment

An image formation system according to the sixth embodiment of the present invention has a hardware configuration identical to that shown in FIGS. 1-3, and thus, description thereof is not repeated here.

The image formation system of the present embodiment is characterized in that the client PC makes an authentication request collectively.

Figure 13:
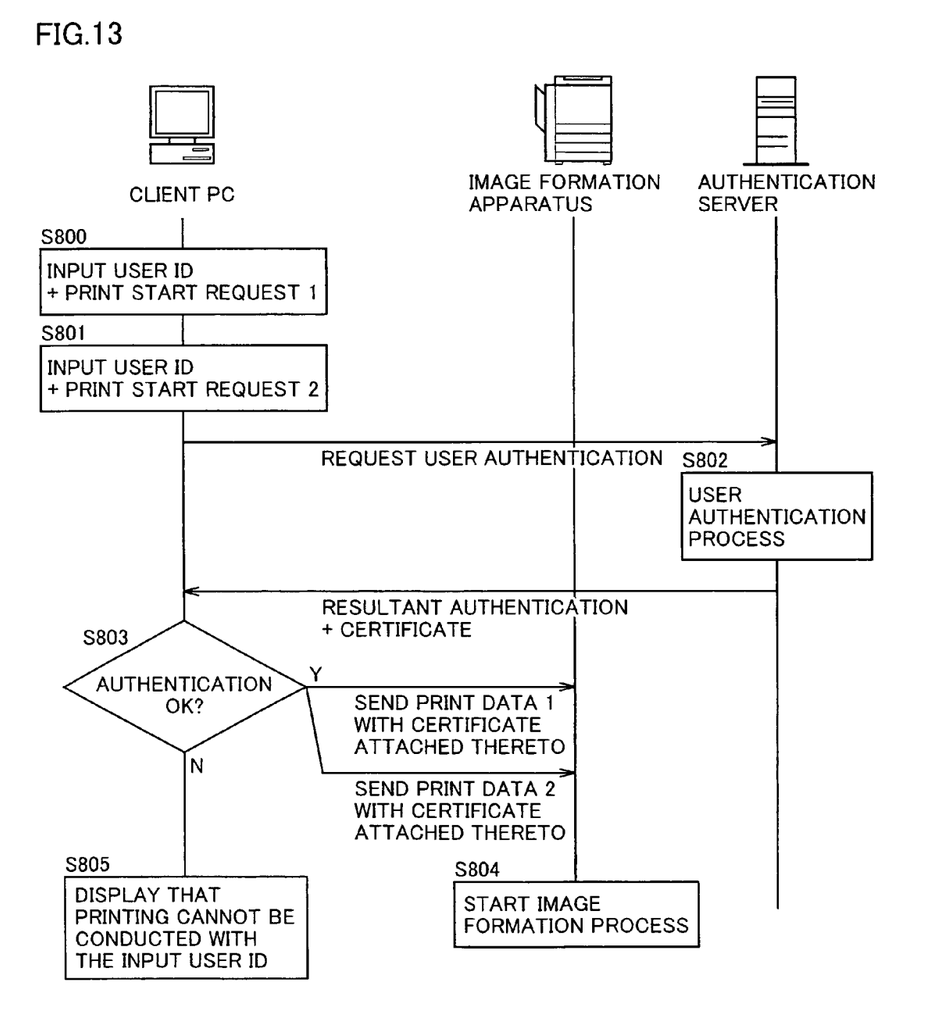
FIG. 13 is a flowchart illustrating a process carried out in an image formation system according to a sixth embodiment of the present invention.

FIG. 13 is a flowchart illustrating a process carried out in an image formation system according to the sixth embodiment.

In step S800, a user inputs a user name and an ID or password (user information) for identification of the user on the client PC, and makes a print request. An authentication request is made to the authentication server collectively for the print requests made during a predetermined period of time (S801) since the print request was made in step S800.

In step S802, the authentication server performs the user authentication process.

A resultant authentication OK/NG is sent to the client PC. In the case of the authentication OK, a certificate is also sent to the client PC having made the request.

In the case of the authentication OK as a result of the user authentication process (YES in S803), the client PC sends to the image formation apparatus the print data corresponding to the respective print requests made in steps S800 and S801, with the certificate attached thereto. In response, the image formation apparatus starts the image formation process, wherein the print data are converted to image data, and images are generated based on the image data and copied on recording sheets (S804).

In the case of the authentication NG (NO in S803), in step S805, the client PC provides a display indicating that printing cannot be conducted with the input user ID.

Operation 3 of Image Formation Apparatus

Figure 14:
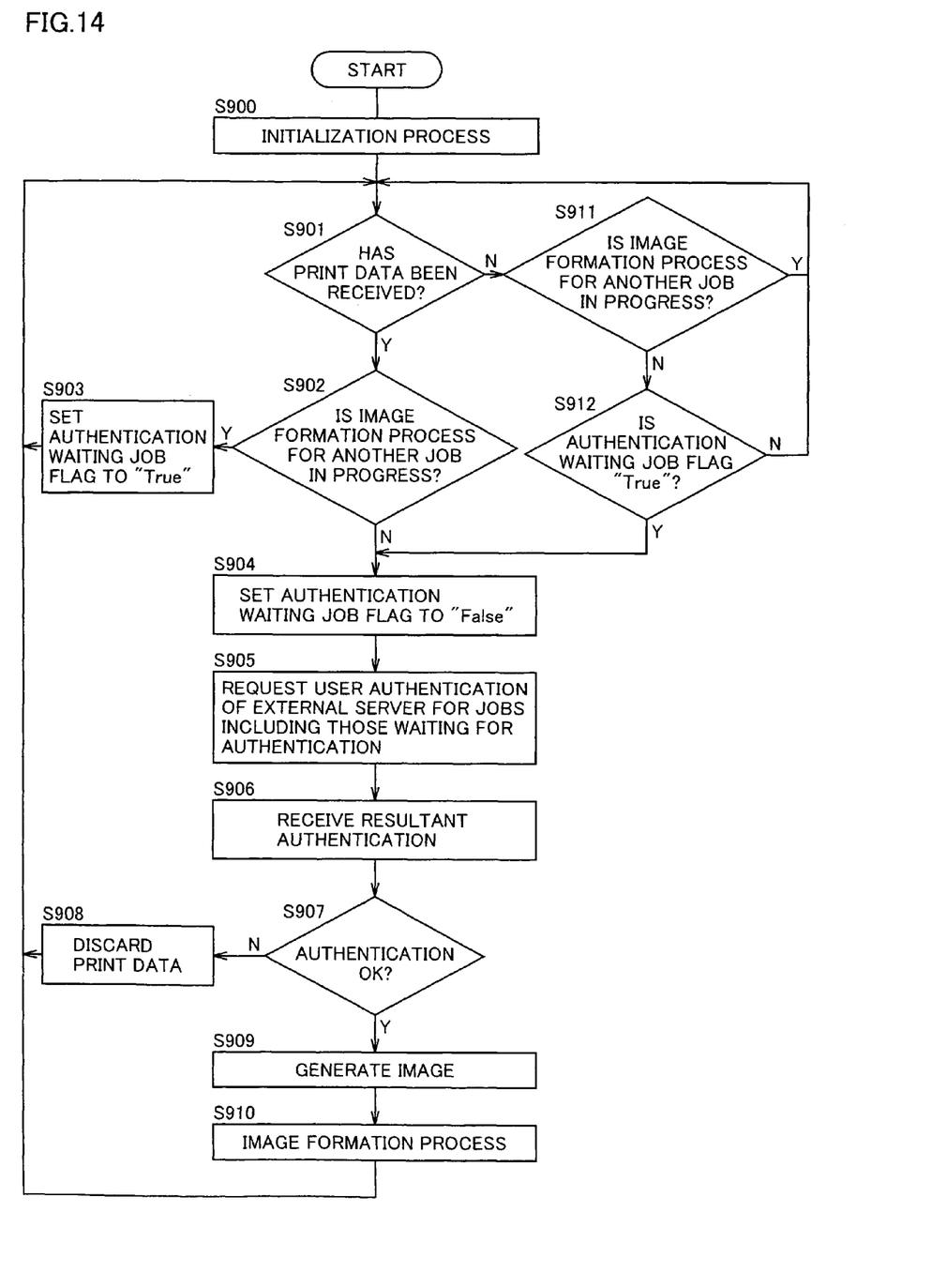
FIG. 14 is a flowchart illustrating an operation of an image formation apparatus that is adopted into the image formation system according to the fifth embodiment.

FIG. 14 is a flowchart illustrating an operation of an image formation apparatus that is adopted into the image formation system according to the fifth embodiment of the present invention.

Referring to FIG. 14, an initialization process is conducted in step S900. In step S901, the image formation apparatus determines whether print data has been received. If YES, it determines in step S902 whether an image formation process is in progress for another job.

If NO in step S902, in step S904, it sets an authentication waiting job flag to "False". In step S905, the image formation apparatus requests user authentication of the external server for the jobs including those waiting for authentication. In step S906, it receives a resultant authentication from the external server.

In step S907, it determines whether authentication is OK. If YES, it generates an image in step S909, and performs the image formation process in step S910. It then returns to step S901.

If NO in step S907, it discards the print data in step S908, and returns to step S901.

If YES in step S902, it sets the authentication waiting job flag to "True" in step S903, and returns to step S901.

If NO in step S901, in step S911, the image formation apparatus determines whether the image formation process is in progress for another job. If YES, it returns to step S901. If NO, it determines in step S912 whether the authentication waiting job flag is "True". If YES in step S912, it goes to step S904. If NO, it returns to step S901.

In the present embodiment, when print data is received while the image formation process is in progress for another job, the relevant job is put into the authentication waiting state (authentication waiting job flag "True"). For the jobs waiting for the authentication having been accumulated while the image formation process is in progress, the authentication is conducted collectively when the image formation process is no longer in progress.

With this configuration, the burden of the authentication process with respect to the external server is reduced while security is maintained.

It is noted that the authentication request to the external authentication server may be made when a predetermined period of time has passed since the arrival of the first piece of print data. In this case, the authentication may be requested collectively for all the pieces of print data received during the predetermined period of time.

Effects of Embodiments

As described above, in an image formation system and apparatus where an authentication process is performed in an external server upon a print request from a PC, a validity period is provided for a resultant authentication. This enables the subsequent, time-consuming authentication processes with respect to the external server to be skipped within the validity period, so that productivity in image formation is guaranteed while security is ensured.

Further, requesting the authentication process of the external server collectively for a plurality of jobs can also reduce the burden of the authentication process with respect to the external server, again guaranteeing the productivity in image formation while ensuring security.

It is possible to provide a program for execution of the process illustrated in any of the flowcharts in the embodiments above. The program may be provided to a user by recording it on a recording medium such as CD-ROM, flexible disk, hard disk, ROM, RAM or memory card. Alternatively, the program may be downloaded to a device via a communication link such as the Internet.

In the embodiments described above, MFP has been given as an example of the image formation apparatus. The image formation apparatus of the present invention however is not restricted to the MFP. For example, a printer having a network function may constitute the image formation apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image formation system comprising a terminal device, an image formation apparatus and a server device,
   said terminal device including
      an inputting portion inputting user identification information, and
      a sender sending a plurality of print jobs to said image forming apparatus, each print job of the plurality including user identification information associated therewith,
   said image formation apparatus including
      a receiver receiving a plurality of print jobs and said user identification information associated therewith,
      a requester requesting authentication of said server device for a first print job received from the plurality of print jobs if a certificate with matching user identification information is not found in said image formation apparatus, said authentication indicating if said user identification information associated with said first job is one from a user permitted to use said image formation apparatus,
      an image forming portion, upon receipt of the certificate issued by said server device indicating that the user is permitted to use said image formation apparatus, forming an image based on said first print job,
      a holder holding said certificate including said user identification information in said image formation apparatus during a validity period defined for said certificate, and
      a simplified authentication portion determining if user identification information associated with at least a second print job from the plurality of print jobs received by said image formation apparatus corresponds to said user identification information of the certificate held by said holder,
      said image forming portion performing an image formation process for the at least a second print job when said simplified authentication portion determines that the certificate exists with said user identification information, without requesting authentication of the server,
   said server device including
      an authentication portion performing authentication as to whether a user is one permitted to use said image formation apparatus based on the user identification information for which the authentication was requested by said requester, and
      an issuer issuing a certificate indicating that a user is permitted to use said image formation apparatus by said authentication portion and sending the certificate to said image formation apparatus.

2. The image formation system according to claim 1, wherein said image formation apparatus further includes a setter setting the validity period that is defined for said certificate.

3. The image formation system according to claim 1, wherein said terminal device further includes a setter setting the validity period that is defined for said certificate, and a notifying portion notifying said image formation apparatus of the validity period set by said setter.

4. The image formation system according to claim 1, wherein said server device further includes a setter setting the validity period that is defined for said certificate, and a notifying portion notifying said image formation apparatus of the validity period set by said setter.

5. The image formation system according to claim 1, wherein said validity period is set for each user.

6. The image formation system according to claim 1, wherein said image formation apparatus further includes a deleting portion deleting the certificate upon expiration of its validity period.

7. An image formation apparatus, comprising:

a receiver receiving a plurality of print jobs, each print job from the plurality of print jobs including user identification information associated therewith;

a requester requesting authentication of an authentication device external to the image formation apparatus for a first print job received from the plurality of print jobs if a certificate with matching user identification information is not found in said image forming apparatus, said authentication indicating if said user identification information associated with said first print job is one from a user permitted to use said image formation apparatus;

a printer, upon receipt of the certificate issued by said external authentication device indicating that the user is permitted to use said image formation apparatus, printing an image based on said first print job;

a holder holding said certificate including said user identification information in said image formation apparatus during a validity period that is defined for said certificate; and a simplified authentication portion determining if user identification information associated with at least a second print job from the plurality of print jobs received by said image formation apparatus corresponds to user identification information of the certificate held by said holder;

said printer performing an image formation process for at least the second print job when said simplified authentication portion determines that the certificate exists with said user identification information, without authentication by said requester.

8. The image formation apparatus according to claim 7, further comprising a setter setting the validity period that is defined for said certificate.

9. The image formation apparatus according to claim 7, wherein said validity period is set for each user.

10. The image formation apparatus according to claim 7, further comprising a deleting portion deleting the certificate upon expiration of its validity period.

\* \* \* \* \*